UNITED STATES PATENT OFFICE.

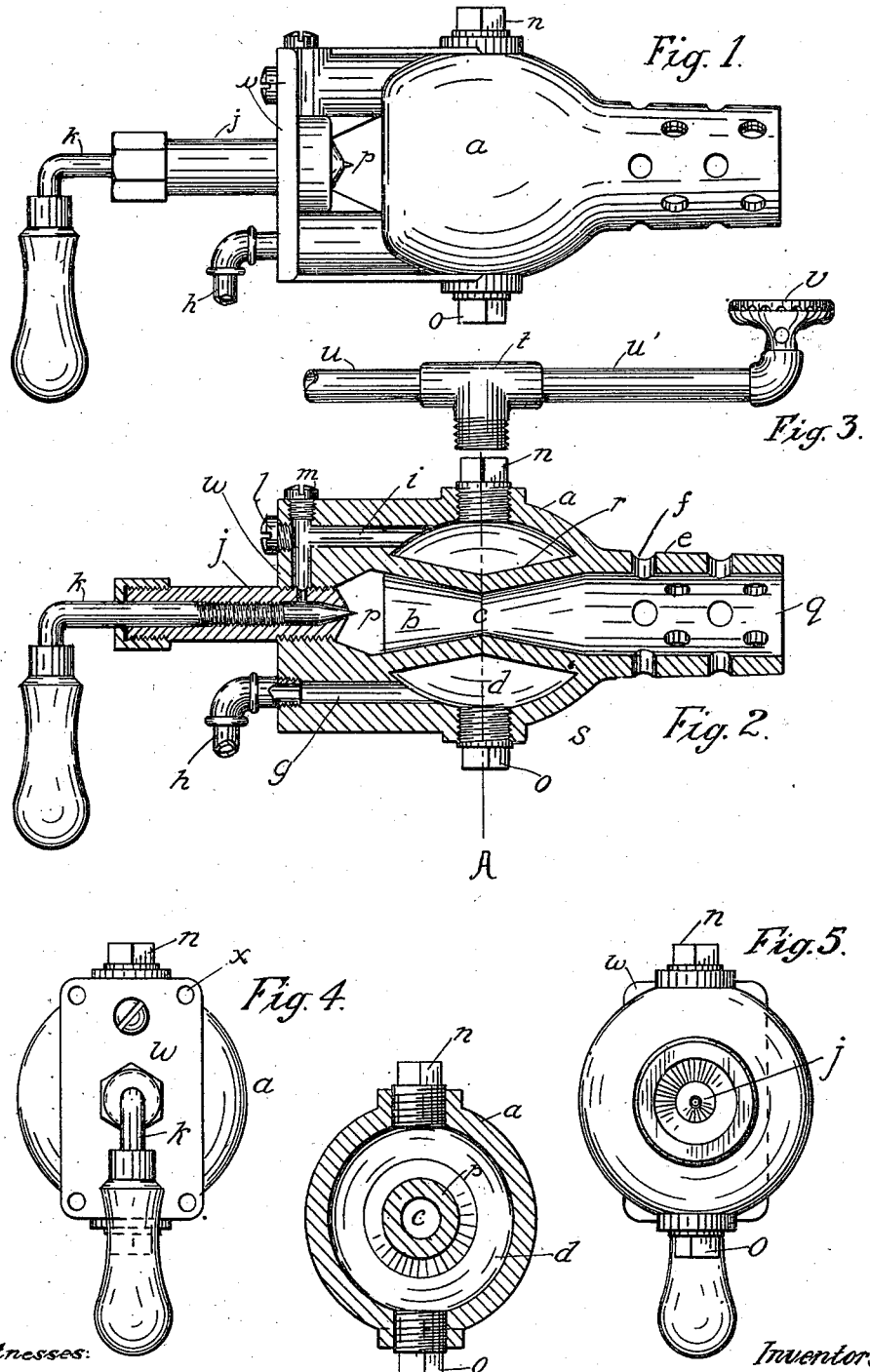

FRED WISSINGER AND WILLIAM E. WILKINSON, OF PORTLAND, OREGON.

HYDROCARBON-OIL BURNER.

989,745.     Specification of Letters Patent.     Patented Apr. 18, 1911.

Application filed September 30, 1909. Serial No. 520,416.

*To all whom it may concern:*

Be it known that we, FRED WISSINGER and WILLIAM ENOCH WILKINSON, citizens of the United States, and residents of Portland, in the county of Multnomah and State of Oregon, have invented a new and useful Improvement in Hydrocarbon-Oil Burners, of which the following is a specification, reference being had to the accompanying drawings, constituting a part thereof.

This invention has for its object to obtain a one piece burner of the type mentioned combining a gas generator chamber, and a mixing chamber, provided with a tubular extension in a single integral casting, and the parts of which are so arranged as to produce a thorough intermixture of the fuel gases and air.

To this end our invention embodies the special features hereinafter set forth.

It is further our object to so adapt the several parts that our device, instead of being operated as a burner, may also be used as a generator for supplying gas to a series of distant burners, arranged in the stove holes of a kitchen range, for example.

In the drawings: Figure 1 is an elevation of our burner; Fig. 2 is a longitudinal section thereof; Fig. 3 shows an auxiliary attachment for our burner when the same is to be used merely as a gas generator for supplying burners situated at some distance therefrom, and located, for example, under the several holes of a kitchen range; Fig. 4 is a rear end view of our burner showing more particularly the plate provided for attaching the same in place in the fire box of a kitchen range; Fig. 5 is a view of the discharge end of our burner; and Fig. 6 is a cross section taken through Fig. 2, on the line A.

As above mentioned, the body, $a$, of our burner is an integral casting comprising a central, tubular, longitudinal mixing chamber, $b$, having a central contraction, or choke, $c$. Peripherally encompassing the mixing chamber, about its said choke, is a generator chamber $d$. The mixing chamber and generating chamber are separated from each other by a partitional wall of substantially uniform cross section, and said wall merges into and is an integral part of a tubular extension $e$, of the mixing chamber; said tubular extension being provided with a plurality of air inlets $f$. The oil is fed into the generator chamber $d$ through a duct $g$, which is attached by a piping connection $h$ with a source of supply; the oil being delivered or fed under pressure, as common in devices of this kind.

From the upper portion of the generator chamber leads a duct $i$ into a valve-neck $j$, the discharge orifice of which is directed into the open, receiving end of the mixing chamber $b$, and said orifice is controlled by a needle-valve $k$.

$l$, $m$ are screw plugs, removable to clean the duct $i$; and $n$, $o$ are plugs for closing up the core holes.

The operation of our device is as follows: The oil being fed into the generator chamber $d$ is discharged from thence, in a suitable spray, through the orifice of the valve $k$ into the mixing chamber $b$. The force of the spray produces a suction at the contracted portion or choke $c$, drawing in air through the opening $p$ between the walls of the ducts $g$, $i$, and thus effecting a primary gas mixture, which is ignited at the outlet $q$ of the tubular extension $e$. The comparatively thin wall $r$, separating the generating chamber from the mixing chamber, soon becomes heated, and then begins the process of gasifying the oil delivered into the gas chamber. The intermixed gases, upon passing the contraction or choke $c$, expand and upon reaching the tubular extension are mixed with air supplied through the openings $f$, and finally the intermixed gases are delivered in a most effective state for combustion at the outlet $q$, at which point the combustion is carried on.

In case it should be desirable, that instead of using our device as a burner the same shall be used as a means for supplying gas to burners located in the respective holes of a kitchen range, for example, we remove the plug $n$ and insert in its place a tee having pipes $u$, $u'$ leading in convenient directions, and provided at their discharge ends with a gas burner of any well known type. When operated under the conditions last mentioned, the size of the flame maintained at the outlet of the tubular extension $e$ will be regulated by a proper adjustment of the valve controlling the oil feed, and the needle-valve, so as to limit such combustion to the degree required for gasifying the oil delivered in the generator chamber $d$.

The plate $w$ is an integral part of our device and, as more clearly shown in Fig. 4, the same is provided with perforations $x$ to receive bolts for fastening our device in position within the fire box of a range, for example.

The parts not particularly described are of the usual and self evident construction.

It is to be noted that the construction shown, and described herein, does away with any pilot or auxiliary means for heating the generator chamber; for that is done by the heat communicated through the wall of the mixing chamber to the gasifying chamber.

We claim:

1. A hydro-carbon burner comprising a casing having a double truncated tube spaced from the walls of said casing, the truncated portions of the tube meeting at approximately the center to provide a choke, the space surrounding the tube forming a generating chamber, the said casing having two extensions connected by a web having an opening, one of said extensions having an opening which communicates with the generating chamber to supply fuel thereto, the other said extension and the web having a duct which communicates with the generating chamber and the opening in the web, a valve casing fitting in the opening in the web and formed with a perforation which registers with the duct, said web and the inner end of the valve casing being spaced from the end of the truncated tube to admit air to the latter, a needle valve operating in the valve casing, and a tubular extension on the casing in line with the double truncated tube, said tubular extension having a series of openings for the admission of air to the vapor.

2. A hydro-carbon burner comprising a casing formed with a double truncated tube spaced from the walls of the casing, said space providing a generating chamber, means for introducing liquid fuel to said generating chamber, the casing having a cylindrical extension into the walls of which the inner surface of one of the truncated portions of the tube merges, said cylindrical extension having air inlet openings, a needle valve in alinement with the center of the double truncated tube and the cylindrical extension, and means for directing the gaseous fuel from the generating chamber to the valve.

FRED WISSINGER.
WILLIAM E. WILKINSON.

Witnesses:
RALPH R. DUNIWAY,
OLAF. O. MARTIN.

---

Copies of this patent may be obtained for five cents each, by addressing the "Commissioner of Patents, Washington, D. C."